US007658363B2

(12) United States Patent
Meyer

(10) Patent No.: US 7,658,363 B2
(45) Date of Patent: Feb. 9, 2010

(54) LAPTOP SECURITY DEVICE FOR TECHNOLOGY WORKSTAND

(76) Inventor: Christopher E. Meyer, 17233 Newhope St., Suite C, Fountain Valley, CA (US) 92708

( * ) Notice: Subject to any disclaimer, the term of this patent is extended or adjusted under 35 U.S.C. 154(b) by 140 days.

(21) Appl. No.: 11/820,687

(22) Filed: Jun. 20, 2007

(65) Prior Publication Data

US 2007/0290115 A1 Dec. 20, 2007

Related U.S. Application Data

(60) Provisional application No. 60/815,087, filed on Jun. 20, 2006.

(51) Int. Cl.
*F16M 13/00* (2006.01)

(52) U.S. Cl. .......................................... 248/551; 70/58

(58) Field of Classification Search ................. 248/551, 248/346.06, 346.03, 500; 70/57, 57.1, 58
See application file for complete search history.

(56) References Cited

U.S. PATENT DOCUMENTS

| | | | | |
|---|---|---|---|---|
| 4,549,727 | A * | 10/1985 | Kozar | 269/70 |
| 5,595,074 | A * | 1/1997 | Munro | 70/58 |
| 5,839,713 | A * | 11/1998 | Wright | 248/346.01 |
| 6,443,417 | B2 * | 9/2002 | Galant | 248/553 |
| 6,488,256 | B1 * | 12/2002 | Chang | 248/670 |
| 6,491,268 | B1 * | 12/2002 | Channer et al. | 248/176.1 |
| 7,032,872 | B2 * | 4/2006 | Sullivan | 248/346.07 |
| 7,174,752 | B2 * | 2/2007 | Galant | 70/58 |
| 2003/0034429 | A1 * | 2/2003 | Carnevali | 248/346.07 |

OTHER PUBLICATIONS a2z Mobile Office Solutions. "a2z Laptop Secure LocDown." Copyright 1995-2005. Jun. 19, 2007. 2 pages. <http://www.a2zsolutions.com/computer/security/secure_locdown.htm>.
LocDown.com. "Secure Media Cart." Copyright 2006-2007. Nov. 1, 2007. 4 pages. <http://www.locdown.com/media-cart-loc.htm>.

* cited by examiner

*Primary Examiner*—A. Joseph Wujciak, III

(57) ABSTRACT

A device for securing a laptop computer to a support panel comprises a pair of security devices each including a vertical member having a pair of prongs extending laterally outwardly therefrom. The laptop computer is securable with the security devices when the laptop computer is in the open position. The security devices are configured to be mountable to the support panel at a spacing greater than the laptop width. Each of the security devices include the prongs which are located above the lower surface of the vertical member at a height greater than a height of the keyboard and which are spaced apart from one another at a distance greater than a thickness of the display monitor. The pairs of prongs extending from respective ones of the vertical members are oriented in facing relationship to one another in order to secure the laptop computer to the support panel.

7 Claims, 3 Drawing Sheets

LAPTOP SECURITY DEVICE FOR TECHNOLOGY WORKSTAND

CROSS-REFERENCE TO RELATED APPLICATIONS

This application claims the benefit of U.S. Provisional Application No. 60/815,087, filed Jun. 20, 2006 and is related to U.S. Utility application Ser. No. 11/820,638 entitled SECURE SHELF FOR TECHNOLOGY WORKSTAND filed on Jun. 20, 2007, the entire contents of both applications being incorporated by reference herein.

STATEMENT RE: FEDERALLY SPONSORED RESEARCH/DEVELOPMENT (Not Applicable)

BACKGROUND

The present invention relates generally to theft prevention devices and, more particularly, to a security device that is specifically adapted to secure a laptop computer to a stationary or portable support or stand such as a technology workstand for securing the laptop computer in the open position so as to effectively prevent theft of the laptop computer.

Computers and computer-related devices have undergone tremendous advancement in recent years. Evidence of this rapid technological growth can be seen in the increasing power of computers in concert with increasing miniaturization of computers and peripherals. For example, computer peripherals such as display monitors are commercially available with increasing amounts of features but in greatly reduced size as evidenced by thin, flat panel monitors that are replacing traditional display monitors.

Although such improvements in computer technology are invaluable in terms of their operational capabilities, certain deficiencies present issues which detract from the overall utility of such devices. In particular, the ultimate reduction in size of computers and computer peripherals has made these items easier to carry and/or conceal. Obviously, such reduction in size has drastically increased susceptibility to theft.

Due to the relatively high expense of computers and peripherals, financial losses due to theft is of special concern for entities such as corporations, government agencies and educational institutions since such entities typically purchase large quantities of these items. As such, it is of primary importance for such entities to address how theft can be reduced prior to making computers and associated devices available to their employees, students and others who may use these computers in public and semi-public areas where theft is of great concern.

In order to reduce losses from theft, various types of anti-theft computer locks are currently available from manufacturers of security products. Although such currently known anti-theft locks may achieve their primary objective of computer protection, they possess certain deficiencies which fail to optimally protect the new generation of computers and computer-related devices.

Perhaps the greatest deficiency associated with conventional anti-theft computer locks is their inability to secure a variety of laptops or other similar devices. For example, certain computer locks must engage and secure a specifically shaped micro-security slot that may be provided by certain computer manufacturers. This limitation has characterized many anti-theft computer locks of the prior art. In this regard, the technological innovation in the field of computer locks has been minimal compared to overall advances in computer technology.

A further deficiency associated with existing computer locks relates to the cables used in certain anti-theft computer locks. Generally, these cables are fixedly attached to and extend from the computer lock at portions which are opposite from their slot engaging portions. Due to the fixed attachment of the cables to the computer locks, the cable portions near such attachment point may become locally strained if secured to a stationary object that is placed in angular orientation to the computer lock. The lock also requires the cable to loop around a stationary object to prevent theft of the laptop computer. Thus, transporting the laptop computer from one room to another room requires unlocking the computer lock to remove the cable from the stationary object in one room, and then re-locking the computer lock after looping the cable around a stationary object in another room.

In view of the above-described shortcomings of conventional anti-theft computer locks, there exists a need in the art for a security device for securing a laptop computer to a fixed surface in an effective manner. More specifically, there exists a need in the art for a security device that can effectively secure a laptop computer to a support panel and which further provides the capability of protecting the device against theft when the laptop computer is oriented in an open position wherein the display monitor is pivoted relative to the laptop keyboard.

BRIEF SUMMARY

The present invention specifically addresses and alleviates the above-referenced deficiencies associated with anti-theft computer locks of the prior art. A preferred embodiment of the present invention provides a security device for securing a laptop computer to a support panel. More specifically, the security device of the present invention is specifically configured to secure the laptop computer to the support panel when the laptop computer is in an open position. In this regard, the security device of the present invention is adapted to allow use of the laptop computer in a variety of public or semi-public settings. For example, the security device enables use of a laptop in medical settings such as in patient, emergency, and operating rooms, as well as at nurse stations or other areas where access to patient records and/or medical records is required.

As is well known in the art, laptop computers typically comprise a display monitor which is pivotally connected to a keyboard. The display monitor is typically moveable via hinges between a closed position and an open position wherein a user may operate the laptop computer. The display monitor and keyboard portions of laptop computers have a thickness associated therewith. Furthermore, the laptop computers are typically rectangularly shaped such that they define a laptop width as well as a laptop depth when in the closed position (i.e., when the display monitor is pivotally moved into contact with the keyboard).

The present invention may comprise a support assembly upon which the laptop may be mounted or supported. The support assembly may include at least one drawer which is typically slideable into and out of the support assembly. The support assembly further includes a support panel disposed above the drawer and which includes upper and lower surfaces. The support panel is sized and configured for supporting the keyboard portion of the laptop computer. In addition to providing a resting surface for the keyboard portion of the laptop computer, the support panel also serves as a lid to an interior of the support assembly or as a cover for a shelf formed in the support assembly within which various items such as laptop accessories such as a battery.

The present invention further comprises a pair of security devices configured to be mountable to the support panel at a spacing that is preferably slightly greater than the laptop width. Each of the security devices preferably comprises a vertical member and a pair of elongated prongs extending laterally outwardly therefrom. The vertical member has a lower surface which is configured to be disposed in abutting contact with the upper surface of the support panel. Additionally, the vertical member also includes at least one and, more preferably, a pair of apertures extending upwardly thereinto.

The security device further includes a pair of elongated and preferably cylindrically-shaped prongs extend laterally outwardly from a side surface of the vertical member. Preferably, the prongs are disposed in spaced parallel relationship to one another and are located and spaced above the lower surface at a height that is preferably greater than a height of the keyboard. When mounted to the support panel, the security devices are preferably oriented such that the pairs of prongs extending from each of the security devices are facing one another. Additionally, the spacing between each of the prongs is preferably greater than a thickness of the display monitor to allow some degree of adjustability of the pivot angle of the display monitor.

The spacing between the prongs is such that the display monitor of the laptop computer is captured or secured between the pair of prongs of the security devices on each side of the laptop computer. The spacing of the prongs above the lower surface is preferably such that keyboard is secured between a forward one of the prongs and the upper surface of the support panel of the support assembly such that the display monitor cannot be slid out between the prongs.

Each of the security devices is preferably mountable to the support panel at a spacing greater than the laptop width such that during operation, the laptop computer is secured against excessive sideways movement. The apertures formed in the lower surface of each one of the mounting fixtures are preferably adapted to receive mechanical fastener that may be extended upwardly through the support panel of the support assembly in order to attach the security devices to the support assembly. The heads of the mechanical fasteners are preferably installed against the lower surface of the support panel from an underside thereof.

The mechanical fasteners are preferably configured as screws or bolts which are extended upwardly through holes or slots formed in the support panel. The mechanical fasteners are preferably threadably engaged to the threaded apertures formed in the vertical members of the security devices. Access to the mechanical fasteners is prevented by providing a locking capability to the support assembly. In particular, the lower surface of the support assembly is inaccessible when the mating tab extending outwardly from a back wall of the support assembly is locked to the fixed tab of the support panel. The tabs preferably include a pair of axially aligned holes that are sized and configured to receive an exteriorly accessible locking mechanism such as a padlock, a key lock, or other suitable lock which is passed through the pair of axially aligned holes.

The security devices and, hence, the laptop computer can only be removed from the support assembly by first removing the locking mechanism and sliding the support panel at least partially back away from the back wall of the support assembly. When the support panel is slid back from the back wall of the support assembly, an opening or gap is created between the back wall and a back edge of the support panel allowing access to the mechanical fastener heads on the lower surface of the support panel. Removal of the mechanical fasteners for at least one of the security devices allows for removal of the laptop computer which can then be slid laterally out of the prongs of the remaining security device fixed to the support panel.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
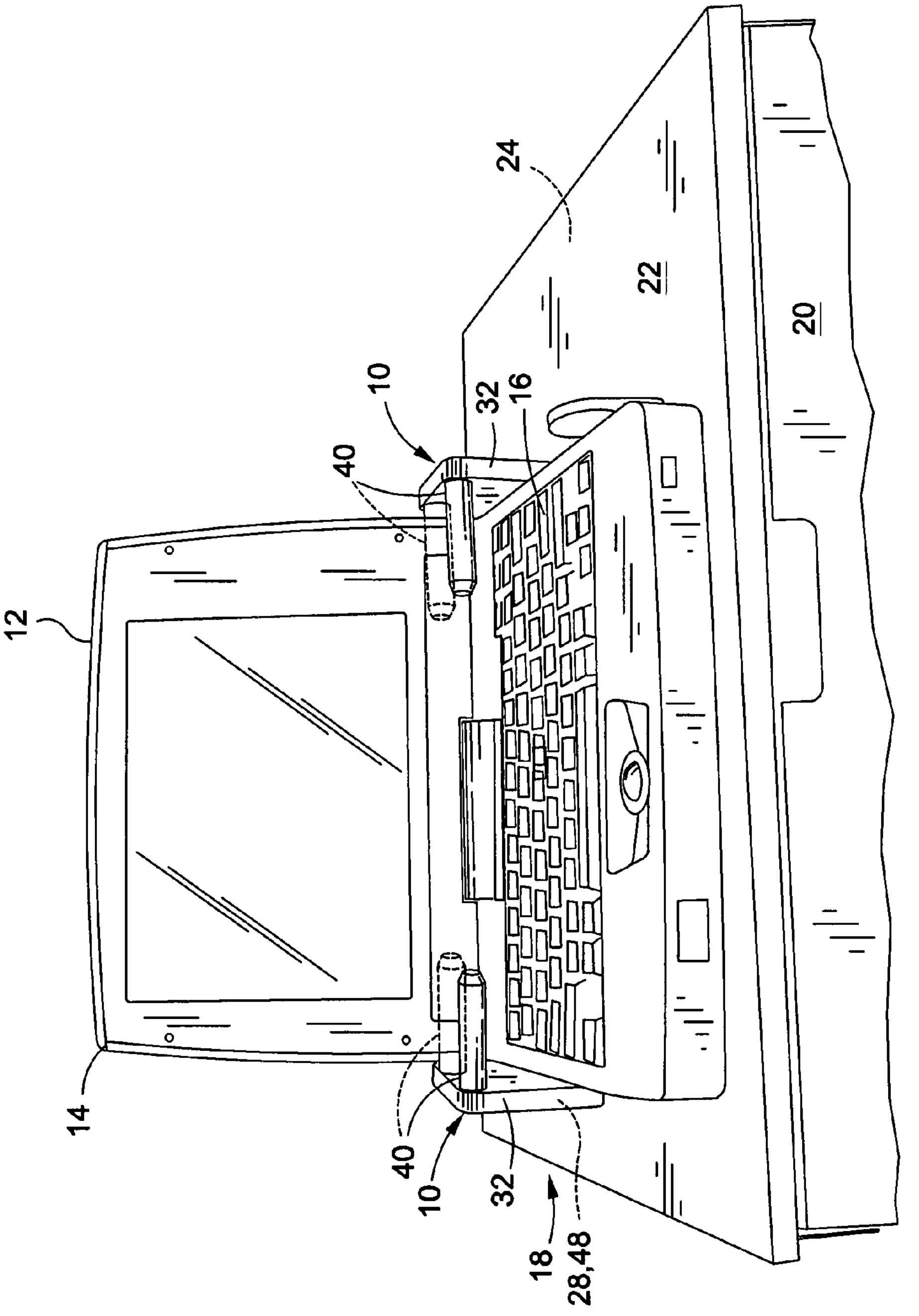
FIG. 1 is a perspective view of a support assembly having the laptop computer supported thereby and further illustrates a security device comprised of a pair of locking features disposed on opposing sides of the laptop computer.

These and other features of the present invention will become apparent upon reference to the drawings wherein FIGS. 1-5 illustrate a security device 10 for securing a laptop computer 12 to a support panel 22. The laptop computer 12 may be comprised of a display monitor 14 which may be pivotally connectable to a keyboard 16 and pivotably moveable in relation to the keyboard 16 by a hinge or hinge mechanism which facilitates movement of the display monitor 14 between an open and a closed position.

As is well known, in the closed position, the display monitor 14 is moved into substantially abutting and/or parallel relationship with the keyboard 16. In the open position, the display monitor 14 may be adjusted in angular relationship with the keyboard 16 to allow access to the keyboard 16 of the laptop computer 12 and to optimize viewing of the display monitor. As described herein, the term keyboard 16 is meant to generally include that portion of a laptop computer 12 which is supported by the support panel 22 and to which the display monitor 14 is hingedly or pivotally connected. In this regard, the keyboard 16 may include additional components in addition to the keyboard 16 elements or keys themselves.

Each of the security devices includes a vertical member having a pair of prongs extending laterally outwardly from one side of the vertical member. As will be described in greater detail below, the prongs are sized and configured to receive the display monitor therebetween. As will be described in greater detail below the prongs are also positioned on the vertical member such that the when the security devices are mounted to the support panel 22, the laptop computer cannot be slid out from between the prongs.

Figure 3:
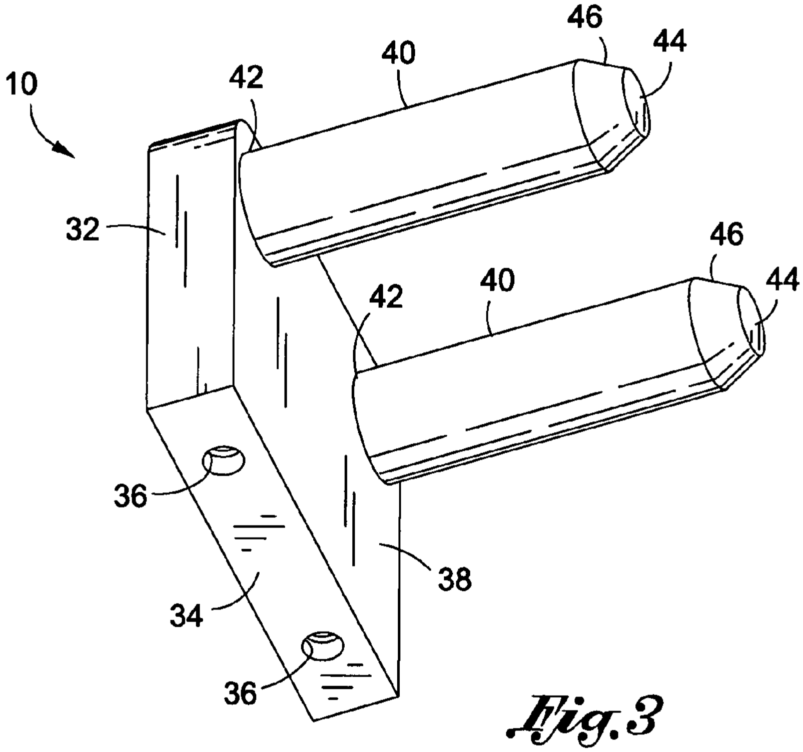
FIG. 3 is a perspective view of the security device illustrating a lower surface of the vertical member which may be affixed to the support panel illustrated in FIG. 1.

The laptop computer 12 may be secured to the support assembly 18 by placing the laptop computer 12 upon the support panel 22 and then pivotally rotating the display monitor 14 into the open position as shown in FIG. 1. Thereafter, each of the security devices 10 may be secured to the support panel 22 by axially aligning the mating apertures 36 formed in the lower surface 34 of the vertical members 32 of the security devices 10 with the holes 28 or slots formed in the support panel 22 as shown in FIG. 3. Mechanical fasteners 48 may be then extended upwardly into the apertures 36 from the lower surface of the support panel 22 in order to allow threadable engagement of the vertical member 32 to the support panel 22. Importantly, the pairs of prongs 40 are preferably oriented as shown in FIG. 1 so that the display monitor 14 is placed in the middle of each pair of prongs 40.

The pair of security devices 10 are adapted to be mounted on opposing sides of the laptop computer 12. In this regard, the security devices 10 are preferably spaced apart from one another at a spacing greater than the laptop width but providing a gap between an edge of the laptop computer 12 and each one of the security devices 10 to facilitate some degree of sideways movement of the laptop computer 12. The security devices 10 are specifically configured to be mountable to the support panel 22 of the support assembly 18.

Importantly, the prongs 40 are disposed in spaced parallel relation to one another and are preferably located above the lower surface 24 at a height which is preferably greater than a height of the keyboard 16. Ideally, the prongs 40 have a length ranging from about two inches to about four inches, with a preferred length of approximately two and one-half inches. In addition, the spacing between the individual prongs 40 is preferably greater than a thickness of the display monitor 14 in order to allow some degree of angular rotation of the display monitor 14 relative to the keyboard 16 when the security device 10 is in use. It is contemplated that the spacing between the prongs 40 on each of the vertical members 32 may allow a user to selectively adjust the pivotal or angular orientation of the display monitor 14 relative to the keyboard 16 by as much as ninety degrees although various other angular pivotal ranges are contemplated. For example, the spacings between the prongs 40 may be such that a user may adjust the pivotal or angular orientation of the display monitor 14 relative to the keyboard 16 by up to thirty degrees. As can be seen in FIG. 1, the pairs of prongs 40 from each vertical member 32 are preferably oriented in facing relationship to one another, to prevent removal of the laptop computer 12.

As shown in FIG. 1, the security device 10 is specifically adapted for securing the laptop computer 12 to the support assembly 18 which may include a drawer 20 with the support panel 22 disposed above the drawer 20. Although shown in a rectangular or box-shaped configuration, the support assembly 18 may be configured as any fixed support and may include the securable drawer 20 slideable thereunderneath. In this regard, the support assembly 18 may be part of a computer cart or portable computer stand such as may be utilized in medical, educational and/or industrial settings. The drawer 20 is preferably slideably disposed into and out of the support assembly 18 and is specifically adapted to be lockable in a closed position in order to prevent access to the lower surface 24 of the support panel 22 upon which the laptop computer 12 rests. Alternatively, a shelf (not shown) may be installed within the support assembly wherein the shelf blocks access to the lower surface of the support panel 22. The shelf may be located above the drawer 20 and may allow opening of the drawer 20 but preventing access to the mechanical fasteners 28 attaching the security devices 10 to the support panel 22.

Figure 4:
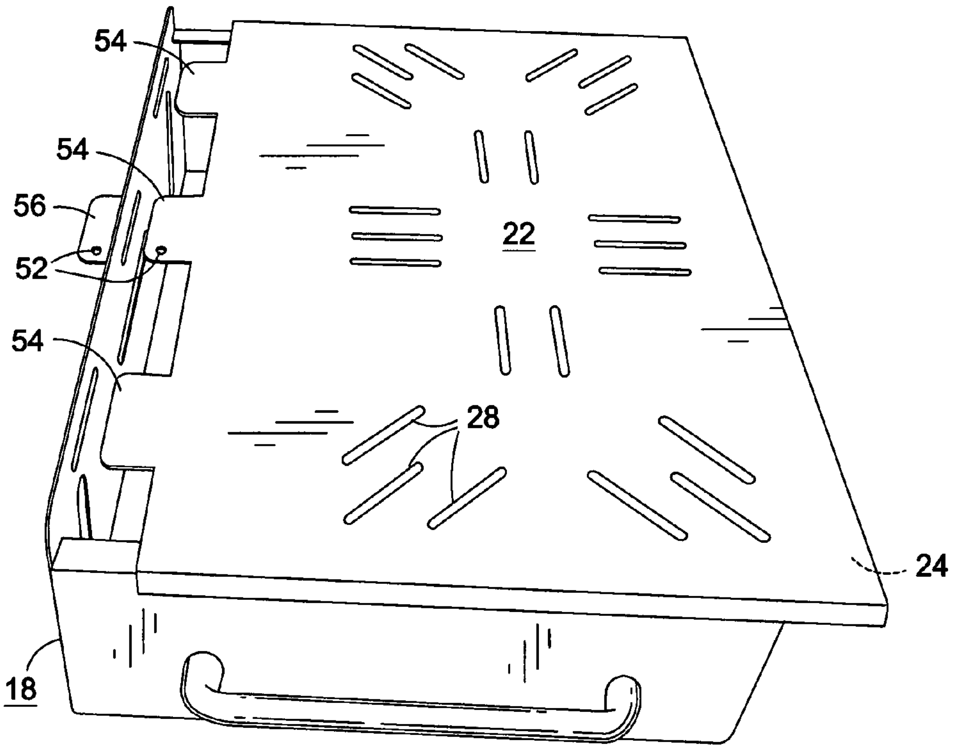
FIG. 4 is a perspective view of a rear of the support assembly and illustrating a back wall thereof having a tab extending outwardly therefrom and which is sized and configured complementary to a tab extending outwardly from the support panel.
Figure 5:
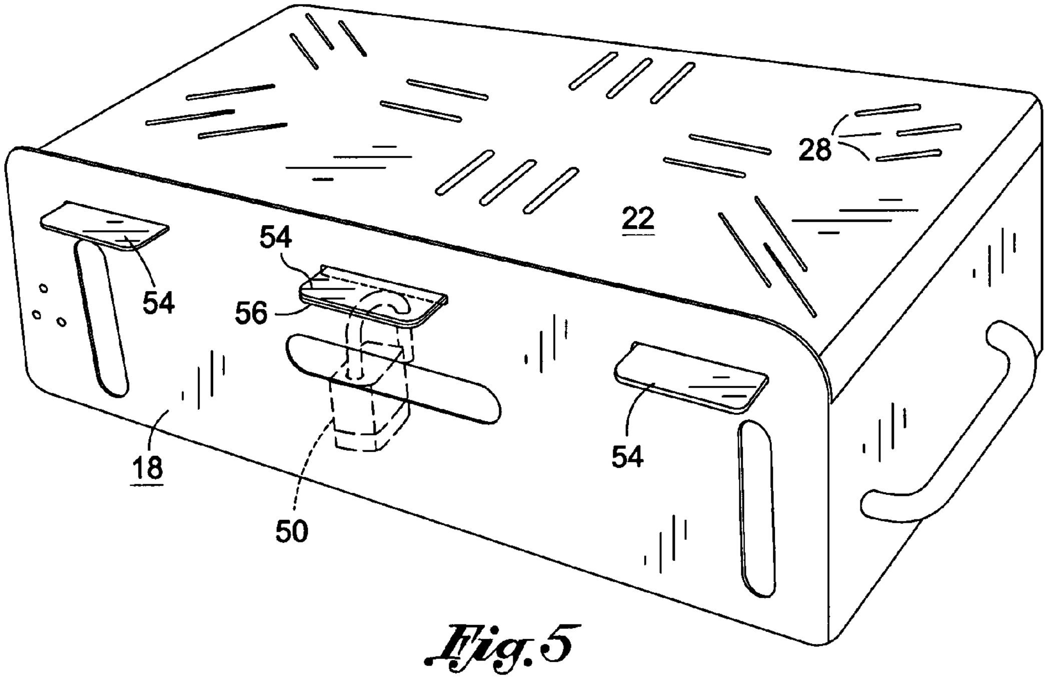
FIG. 5 is a perspective view of a rear of the support assembly illustrating the tabs of the back wall and support panel in locked engagement to one another.

In one embodiment, due to the locking nature of the support panel 22 to the support assembly 18, removal of the mechanical fasteners 48, and, hence, removal of the laptop computer 12 from the support assembly 18, may only be effectuated by first translating or moving the support panel 22 away from a back wall of the support assembly 18. The support panel 22 may be moved by first removing the locking mechanism 50 which may be configured as a key lock, combination lock or any other suitable lock which may be passed through the holes 52 formed in tab 54 and mating tab 56 of the support panel 22 and back wall, as shown in FIGS. 4 and 5. Then, removal of the support panel 22 allows access to the mechanical fasteners 48 extending upwardly from the lower surface 24 of the support panel 22. Upon removal of at least one of the security devices 10, the laptop computer 12 may be easily removed from the support assembly 18 by sliding the laptop computer 12 laterally out between the pair of prongs 40 of the remaining security device 10.

Figure 2:
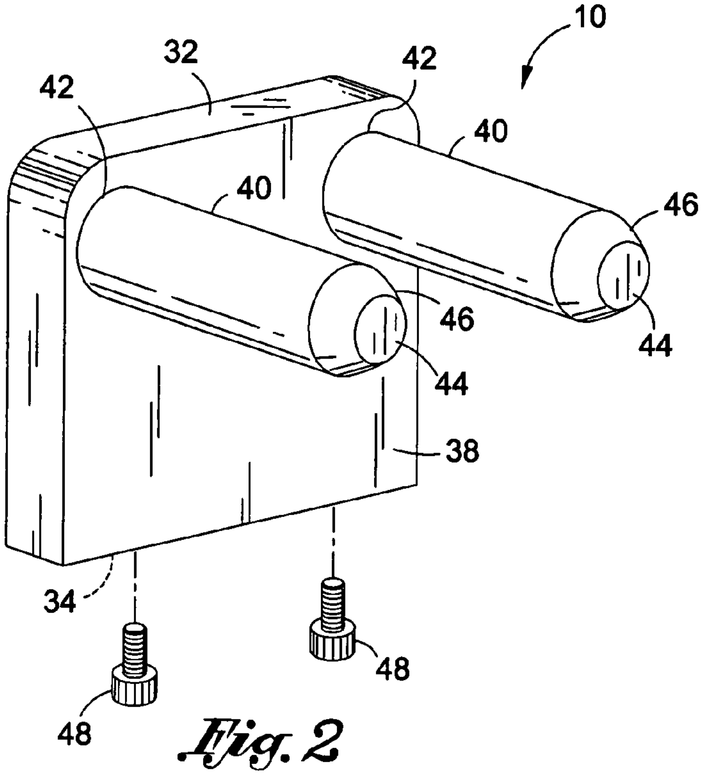
FIG. 2 is a perspective view of the security device comprised of a vertical member having a pair of prongs extending laterally outwardly therefrom.

Referring more particularly now to FIGS. 2 and 3, each of the security devices 10 comprises the vertical member 32 having the pair of prongs 40 extending laterally outwardly therefrom. Although the prongs 40 are depicted as being generally elongated and cylindrically-shaped, it is contemplated that the prongs 40 may be provided in a variety of shapes, sizes and configurations. Indeed, although the prongs 40 are shown as having a taper 46 formed on extreme ends thereof, it is contemplated that the tapers 46 may be altogether omitted from the prongs 40 or alternative treatments such as radiused edges may be provided to the prongs 40.

As shown in FIGS. 2 and 3, each of the security devices 10 comprises the vertical member 32 having a lower surface 34 and a pair of side surfaces 38 with a pair of prongs 40 extending laterally outwardly from one of the side surfaces 38. The lower surface 34 is adapted to be mounted to the support panel 22 of the support assembly 18 shown in FIG. 1. In this regard, the lower surface 34 preferably has at least one and, more preferably, a pair of apertures 36 formed in the security device 10 and extending upwardly from the lower surface 34.

The apertures 36 are specifically adapted to receive the pair of mechanical fasteners 48 such as screws and/or bolts which are preferably threadably engaged to the apertures 36. In the preferred embodiment, the lower surface 34 of each one of the vertical members 32 is preferably substantially planar. Likewise, as can be seen in FIG. 1, the support panel 22 of the support assembly 18 is also preferably substantially planar such that the lower surface 34 may be placed in abutting contact with the support panel 22.

Regarding materials for fabricating the security device 10, it is contemplated that the security devices 10 may each be fabricated of a metallic and/or polymeric material. For example, the vertical members 32 may each be fabricated from aluminum material such as aluminum plate stock although other materials and/or shapes and sizes of the vertical member 32 are contemplated. Likewise, each of the prongs 40 may be similarly fabricated from a metallic material such as aluminum and may be permanently (i.e., non-removably) secured to the vertical member 32 in the manner shown in FIGS. 2 and 3 such as by any number of suitable methods including, but not limited to, press fitting, bonding such as by adhesive, welding and any other suitable method.

Alternatively, it is contemplated that each of the security devices 10 may be fabricated as a unitary structure such as by machining the vertical member 32 and prongs 40 from a single piece of material or by casting or otherwise forming the security devices as a unitary structure. The appropriate treatments such as tapering the ends of the prongs 40 may be provided. Corners of the vertical member 32 may be radiused or provided with alternative treatments. The apertures 36 may be tapped in order to facilitate threadable engagement of mechanical fasteners thereinto although other engagement mechanisms may be provided to allow engagement of the mechanical fasteners to the vertical member 32.

FIGS. 4 and 5 show the support panel 22, which preferably has a set of holes and/or slots 28 formed at a spacing complementary to the spacing between the apertures 36 of respective ones of the security devices 10 as in FIGS. 2 and 3. Additionally, the holes and/or slots 28 are preferably formed in a plurality of spacings, locations and orientations on the support panel 22 in order to allow for flexibility when mounting laptop computers 12 or various sizes and configurations. The apertures 36 are preferably threaded and adapted to threadably receive the mechanical fasteners. The mechanical fasteners are adapted to be installed from a lower surface 24 of the support panel 22 such that the mechanical fasteners extend from the lower surface 24 of the support panel 22 upwardly into the apertures 36 of the vertical members 32.

As shown in FIGS. 4 and 5, the support panel 22 may then be secured on the support assembly 18 by inserting the tabs 54 (which extend from a rear of the support panel 22) through complementary slots formed in a back wall of the support assembly 18. In this position, the sides of the support panel 22 rest against or are supported by opposing side walls of the support assembly 18. At least one of the tabs 54 extending outwardly from the back wall is aligned with a complementary mating tab 56 extending outwardly from the support panel 22 such that the holes 28 formed therein are axially aligned. The locking mechanism 50 such as a pad lock or combination lock is passed through the axially aligned holes 52 in order to secure the tab 54 and the mating tab 56 together. Because the support panel 22 of the support assembly 18 is specifically adapted to be locked to the back wall of the support assembly 18, the lower surface 24 and, hence, the mechanical fasteners cannot be removed.

The above description is given by way of example, and not limitation. Given the above disclosure, one skilled in the art could devise variations that are within the scope and spirit of the invention disclosed herein, such as, for example, methods and materials for fabricating the security devices may include injection molding thereof from a high strength polymeric material. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A device for securing a laptop computer to a support panel when the laptop computer is in an open position, the laptop computer having a laptop width and comprising a display monitor pivotally connectable to a keyboard supportable by the support panel, the display monitor being moveable between the open position and a closed position, the display monitor and keyboard each having a thickness, the security device comprising:

a pair of security devices configured to be mountable to the support panel at a spacing greater than the laptop width, each of the security devices comprising:

a vertical member having a lower surface and a pair of side surfaces defining a rectangular block shape of the vertical member, the lower surface having a pair of apertures extending upwardly thereinto; and a pair of elongated prongs extending laterally outwardly from one of the side surfaces and being located above the lower surface at a height greater than a thickness of the keyboard, the prongs being spaced from one another at a distance greater than a thickness of the display monitor, the prongs being non-movable relative to the vertical member and being disposed in parallel relation to one another, whereby the display member is in between two prongs;

wherein:

the security devices being oriented in spaced parallel relation to one another;

the pair of prongs extending from respective ones of the vertical members and being oriented in facing relationship to one another;

the pair of apertures of each of the security devices being adapted to receive a corresponding pair of mechanical fasteners to secure the security device to the support panel to prevent removal of the laptop computer from the support panel when the security devices are disposed on opposing sides of the laptop computer.

2. The device of claim 1 wherein the apertures are threaded and adapted to threadably receive the mechanical fasteners extending upwardly thereinto from the support panel.

3. The device of claim 1 wherein:

the lower surface of each one of the vertical members is substantially planar; and the support panel being substantially planar such that the lower surface may be placed in abutting contact therewith.

4. The device of claim 1 wherein the spacing between the prongs of each one of the security devices is such that the display monitor may pivot relative to the keyboard.

5. The device of claim 4 wherein the spacing between the prongs of each one of the security devices is such that the display monitor may pivot up to ninety degrees relative to the keyboard of the laptop computer.

6. The device of claim 5 wherein the spacing between the prongs of each one of the security devices is such that the display monitor may pivot up to thirty degrees relative to the keyboard of the laptop computer.

7. The device of claim 1 wherein each of the prongs has a tapered end.

* * * * *